J. HALSIG.
MACHINE FOR BAGGING AND WEIGHING GRANULAR AND POWDERY SUBSTANCES, PARTICULARLY COCOA POWDER.
APPLICATION FILED MAR. 16, 1915.

1,219,302. Patented Mar. 13, 1917.
6 SHEETS—SHEET 2.

Inventor.
Joseph Halsig
by his attorneys
Briesen & Knauth

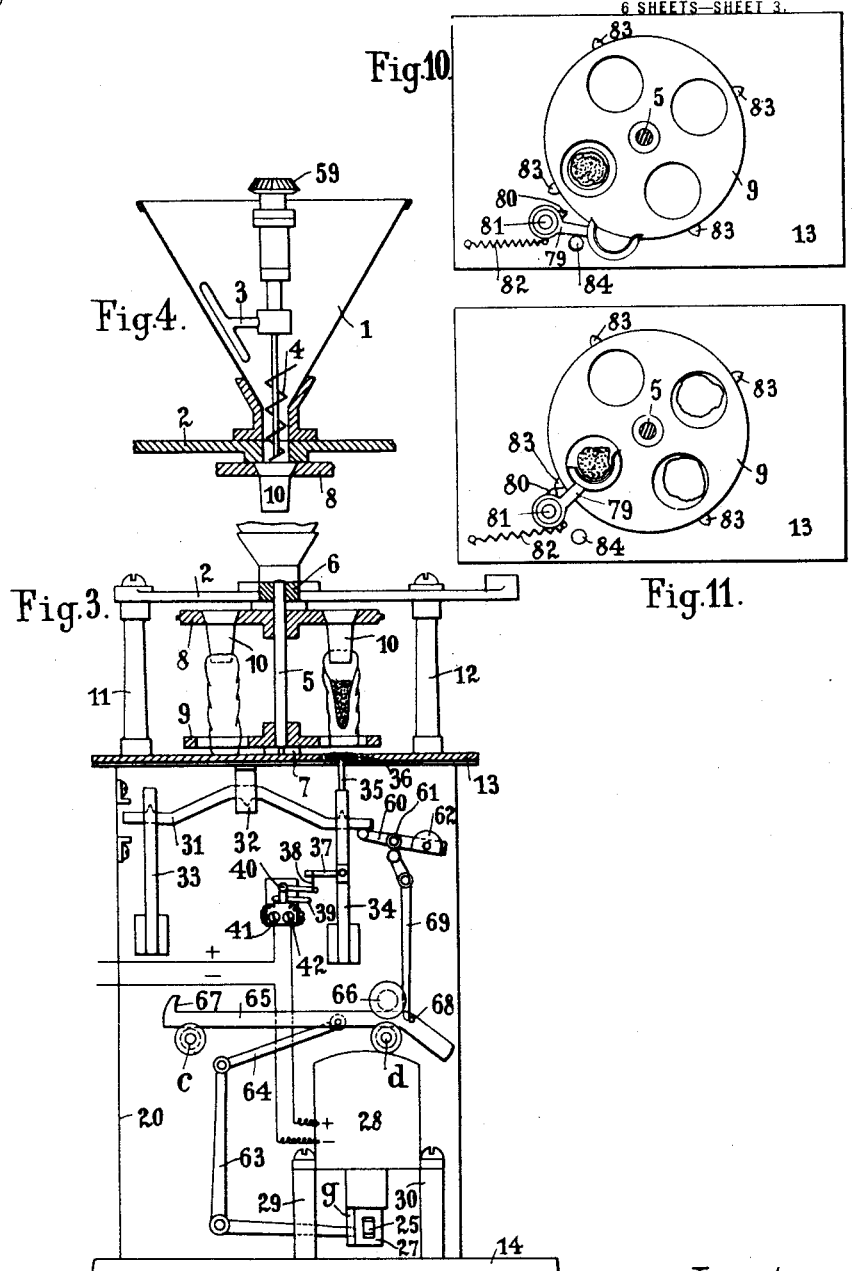

J. HALSIG.
MACHINE FOR BAGGING AND WEIGHING GRANULAR AND POWDERY SUBSTANCES, PARTICULARLY COCOA POWDER.
APPLICATION FILED MAR. 16, 1915.

1,219,302.

Patented Mar. 13, 1917.
6 SHEETS—SHEET 4.

Inventor.

Joseph Halsig
by his attorneys
Briesen & Gumpe

J. HALSIG.
MACHINE FOR BAGGING AND WEIGHING GRANULAR AND POWDERY SUBSTANCES, PARTICULARLY COCOA POWDER.
APPLICATION FILED MAR. 16, 1915.

1,219,302.

Patented Mar. 13, 1917.
6 SHEETS—SHEET 5.

Inventor.
Joseph Halsig
by his attorneys
Briesen & Knauth

J. HALSIG.
MACHINE FOR BAGGING AND WEIGHING GRANULAR AND POWDERY SUBSTANCES, PARTICULARLY COCOA POWDER.
APPLICATION FILED MAR. 16, 1915.

1,219,302.

Patented Mar. 13, 1917.
6 SHEETS—SHEET 6.

Inventor
Joseph Halsig
By his Attorneys

UNITED STATES PATENT OFFICE.

JOSEPH HALSIG, OF VIERSEN, GERMANY.

MACHINE FOR BAGGING AND WEIGHING GRANULAR AND POWDERY SUBSTANCES, PARTICULARLY COCOA POWDER.

1,219,302.   Specification of Letters Patent.   Patented Mar. 13, 1917.

Application filed March 16, 1915. Serial No. 14,790.

*To all whom it may concern:*

Be it known that I, JOSEPH HALSIG, a subject of the King of Prussia, residing at 8ª Goetersstrasse, in the town of Viersen, Rhine Province, Germany, have invented new and useful Improvements in Machines for Bagging and Weighing Granular and Powdery Substances, Particularly Cocoa Powder, of which the following is a specification.

Automatically working machines exist in which the substances to be weighed are first filled into packages, for instance, bags, boxes, or the like, in approximate quantities and are thereafter brought to weight by accurate weighing. The present invention relates to a particular constructive form of such a machine.

In the machine according to this invention the packages are also passed, by means of a revolving supporter, singly below an adjustable measuring device which fills the package with the larger portion of the charge to be weighed whereafter the continued movement of the supporter places the charged packages upon a weighing device to receive, while the movement of support is stopped, a further filling charge to bring the previously measured packing up to the desired weight.

According to this invention the movement of the revolving support is controlled by means of a mercury contact, a magnet, and a double coupling.

In the accompanying drawings,

Figure 1 shows a front elevation and

Fig. 2 a side elevation of the machine.

Fig. 3 is a part-sectional view of the machine, while

Fig. 4 shows a section through the bagging device.

Figure 6:
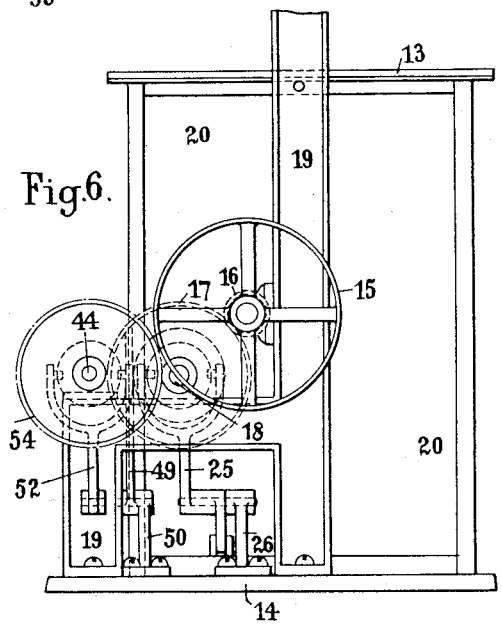

Fig. 6 a rear view of the transmission gear.

Figure 7:
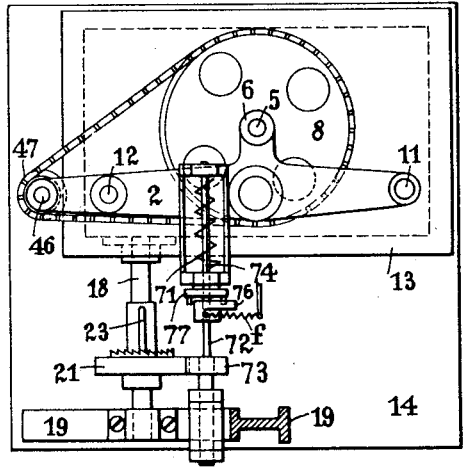

Fig. 7 is a top view of the weighing device.

Figure 8:
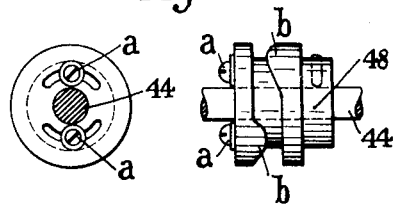

Fig. 8 shows two enlarged views of the cam disk 48.

Figure 9:
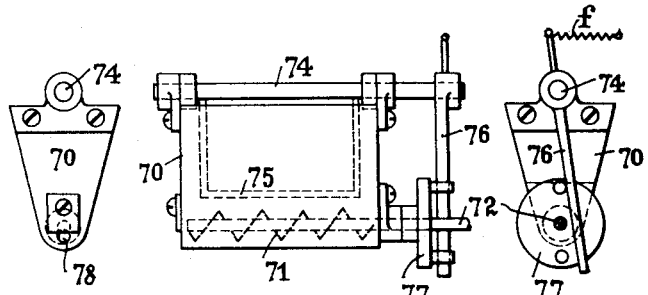

Fig. 9 shows enlarged views of the weighing device.

In Figs. 10 and 11 a device for placing the bags or the like packages upon the weighing pan for supplementary weighing is shown in top views.

Figure 13:
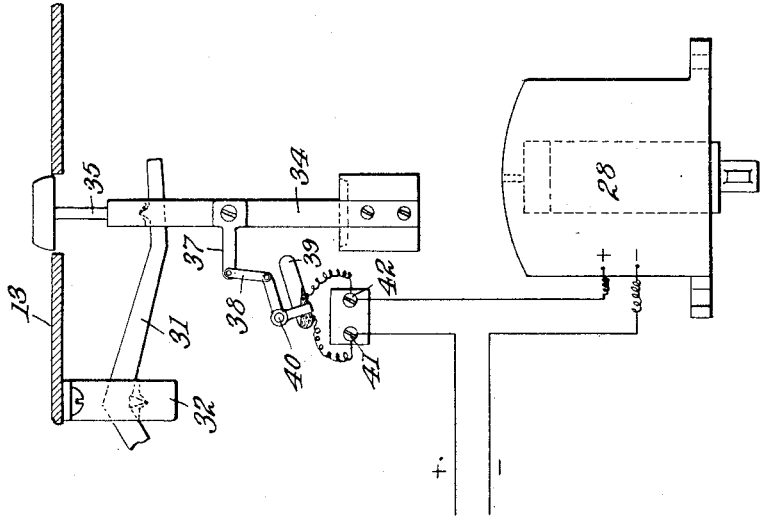
Figure 12:
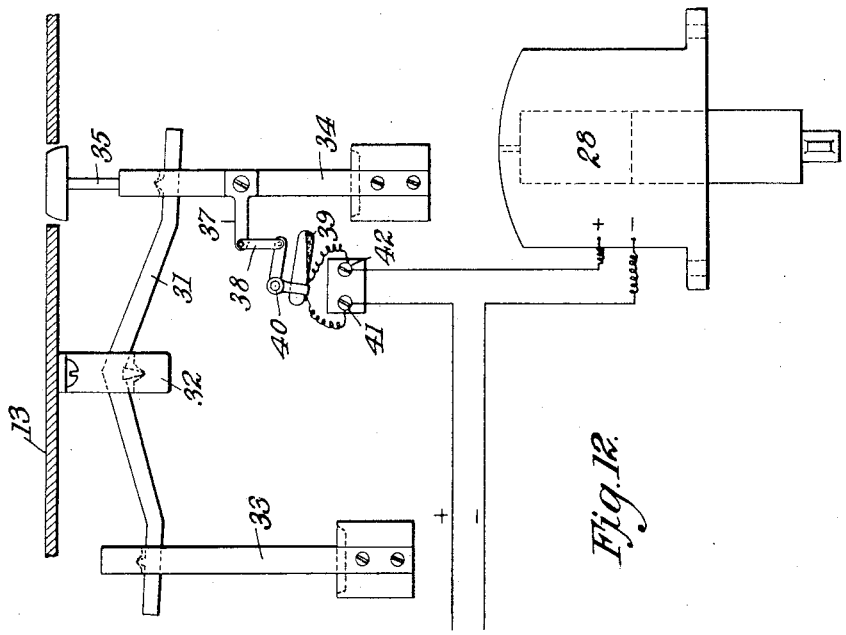

Figs. 12 and 13 are details of the mercury contact showing the parts in different positions.

The substance to be weighed is fed into the funnel 1 by hand or by mechanical means. The funnel 1 is fixedly mounted upon the bridge 2, and is provided with a stirring arm 3 and a conveying worm 4; Fig. 4.

Below the bridge 2 a revolving support or carrier is moving that consists of a shaft 5 mounted in a hub 6 of the bridge 2 and a bearing disk 7 and upon which the revolving disks 8 and 9 are fastened. These disks are each provided with four or more bore holes or openings placed at equal distances apart in a circle. The upper revolving disk 8 is constructed as a sprocket wheel and carries tubes 10 fixed below the openings. These tubes are a continuation of the openings in the disk. The revolver is mounted in such a way that the openings of the revolving disks 8 and 9 can be singly brought to register with an opening provided in the bridge for the bagging device.

The paper bags or containers to be filled are slipped over the tubes or nozzles 10 in such a way that the bottoms of the bags stand freely within the openings of the disk 9.

The bridge 2 is mounted upon two columns 11, 12, fastened on the table 13.

The machine may be operated from a pulley 15 by means of a small electromotor which is to be placed upon the base plate 14. The pulley 15 rotates the shaft 18 through the gear wheels 16, 17.

One bearing of the shaft 18 is mounted upon the post 19 while the other bearing is screwed onto the machine box 20.

Upon the shaft 18 is loosely rotated the belt pulley 21 which on one face is provided with a toothed coupling disk. In addition, the shaft 18 carries, on the other side, the toothed gear wheel 22 which is also provided with a toothed coupling disk. Between the belt pulley 21 and the gear wheel 22 the shaft 18 is made of greater diameter, and upon this strengthened part the double faced coupling 24 (Figs. 7, 8) is slidably mounted on a key 23 partly sunk into the shaft. A clutch lever 25 pivoted in the post 26 engages the coupling. One end of the clutch lever 25 projects into the machine box 20 and is pivotally connected to the boss 27 which is screwed to the iron core of the electro-magnet 28 Figs. 2, 3). The electro-magnet is mounted upon two columns 29, 30, and is connected through an electric conductor with the conductor of the driving motor, both parts being operated through one switch.

Figure 1:
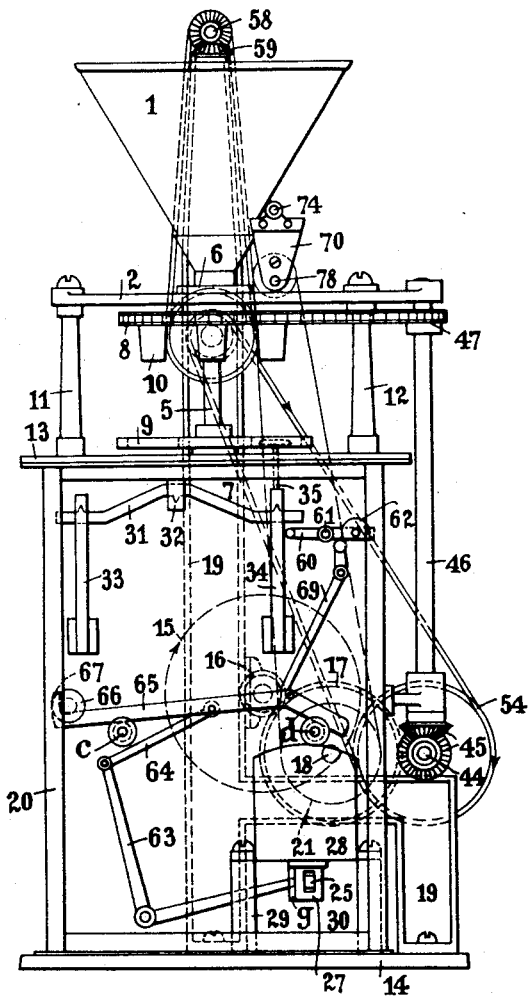

The weighing device is mounted within the machine box 20 and consists of a balance beam 31 carried on a knife edge by the housing 32. At both ends of the balance beam the scales 33, 34, are suspended on knife edges. (Figs. 1, 3). For supporting the charge, the weighing scale 34 carries above the weighing beam 31 a pan 35 which projects through an opening of the table 13.

The weighing scale 33 serves for carrying the stamped weights which the weight of the packages is to be made to equal.

One carrying rod of the scale 34 is provided with an arm 37 which carries, on a readily movable lever 38, a mercury contact 39, consisting of an exhausted glass tube having two contact pieces soldered in and containing a small quantity of mercury.

The mercury contact 39 swings easily in the bearing 40 and the contact pieces are connected to the insulated screws 41, 42, by means of readily movable coiled wires. The conducting wires of the magnet 28 are also connected to these screws.

The operation is as follows:

To set the machine into operation the motor is switched on and the conductors of the magnet are simultaneously subjected to the current. It is supposed that the machine is in the position when a weighing action is being finished.

At the moment of finishing a weighing action the scale 34 with the weighing pan 35 is lowered so much that through the arm 37 the mercury contact 39 has been inclined far enough to cause the mercury to leave both contact pieces thereby breaking the contact. The flow of the current to the magnet ceases and the iron core together with the lever 25 (Fig. 3) goes down.

Figure 2:
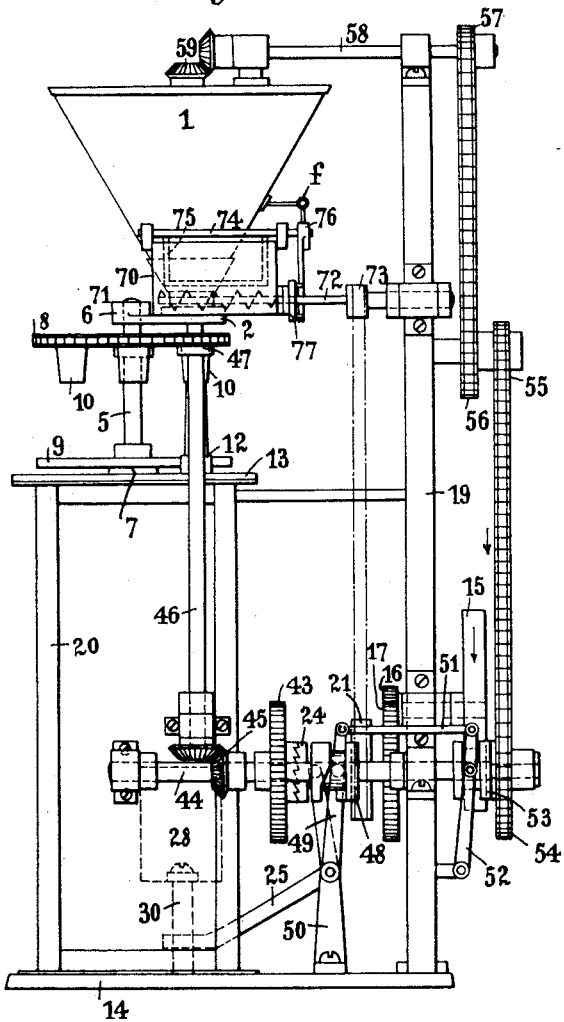
Figure 5:
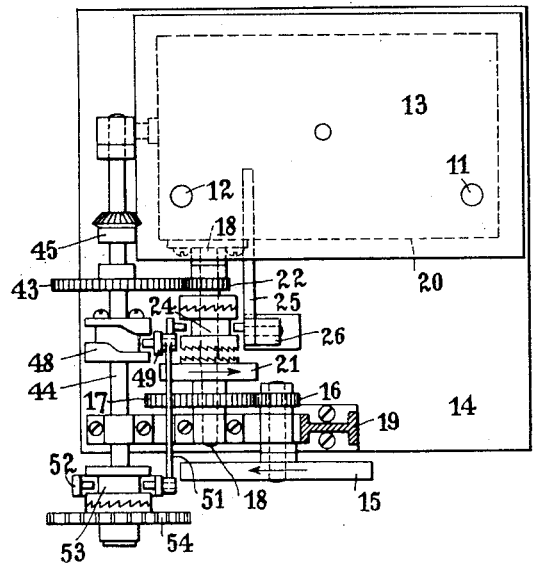
Fig. 5 shows a top view.

As this moment the double coupling 24 engages the toothed disk of the gear wheel 22 and rotates same. Gear wheel 22 drives at this time the gear wheel 43 fixedly mounted upon the shaft 44. Through the toothed gear 45 the vertical shaft 46 is driven and rotates the sprocket wheel of the revolving disk 8 through the sprocket wheel 47 and an endless chain and thereby the supporter is rotated (Figs. 1, 2). Through the movement of the revolving supporter the finished weighed bag is moved from the scale pan 35 on to the table 13. The revolving disk 9 keeps the weighing pan 35 and consequently the whole weighing device in its lowest position until the revolver is turned far enough to bring the next opening of the revolving disk 9 into position above the weighing pan 35 which thereupon moves up into the opening.

During the time the revolver moves through a quarter turn to bring the next opening of the revolving disk over the weighing device, the corresponding upper opening with the bag attached passes the bagging device.

As soon as a portion of an opening of the revolving disk 8 covers the opening of the bagging device in the bridge the cam drum 48, fixedly mounted upon the shaft 44, moves by means of the lever 49 that is pivoted in the post 50, and by means of the connecting rod 51 and the clutch lever 52 the slidable coupling 53 into engagement with the toothed disk of the sprocket wheel 54 and rotates same. Thereby, the endless chain of the sprocket wheels 55, 56, as well as the sprocket wheel 57 fixedly mounted upon the shaft 58, is rotated (Fig. 2). By means of the toothed gear 59 the stirring arm 3 and the worm 4 within the funnel 1 are rotated and the substance contained in the funnel is fed into the bag in the desired quantity (Fig. 4).

Before the opening of the revolver leaves the funnel opening entirely, while the revolving supporter continues to move, the cam drum 48 disengages the coupling 53.

The cam drum 48 consists of two parts, each having a cam $b$ (Fig. 8). By varying the relative position of these parts by means of slots and screws $a$ the cams $b$ may be adjusted for shorter or longer coupling periods so that a correspondingly larger or smaller quantity of substance will be fed into the bag while the support is revolving. Since the charges usually vary in weight for an amount up to 10 grams the adjustment is to be chosen so that between 5 and 10 grams are wanting in the proper weight of the bags, which minus is thereupon supplied by the supplementary weighing device.

Through the continued movement of the revolving supporter the charged bag arrives at the weighing pan 35 which is released by the opening in the disk 9 to rise. The small difference of weight between the charged bags and the weight the bag is to have finally permits but a slow rising of the scale 34 and the weighing pan 35.

To obtain a quick and sudden rise of the weighing scale an auxiliary weight lever 60 is pivotally mounted on a stud 61 below the weighing beam 31 (Figs. 1, 3). This lever carries at its opposite end the weight 62.

The weighted lever 60 presses the weighing beam 31 and the weighing pan 35 quickly into the opening of the revolving disk 9. At the same time the arm 37 lifts the mercury contact 39 and switches the magnet 28 on. The double faced coupling 24 disengages the toothed coupling disk of the gear wheel 22 and thereby stops the shaft 44 and consequently the revolving supporter. The double faced coupling 24 immediately rotates the belt pulley 21 by engaging its coupling disk, and sets the supplementary weighing device into operation.

At the same time a bell-crank lever 63 is magnetically attracted which is pivotally fastened within an opening of the tappet $g$ of the iron core of the magnet 28. Through the connecting rod 64 a rail 65 is moved and raised at one end. Thereby, the roll or ball 66 lying upon the rail 65 rolls toward the end 67 of the rail 65 which moves on the guide rolls $c$ and $d$. A stop 68 provided on the rail 65 rocks the lever 69 and the latter raises the weight 62 of the lever 60 and thereby releases the weighing beam (Fig. 1).

For supplying the additional quantity of substance a conveyer worm 71 is mounted in a box 70 on a shaft 72 which is driven by means of a belt pulley 73 from the belt pulley 21 on the shaft 18 (Figs. 2, 7, 9).

Above the worm 71 a shaft 74 is mounted in the walls of the box 70, which shaft carries the stirring frame 75. This stirring frame 75 is operated by means of a lever 76, a spring $f$ and a cam disk 77 fastened upon the shaft 72. Through these connections the stirring frame 75 is given a rocking movement within the box 70 to prevent the substance therein from clogging or bridging.

The worm 71 feeds the substance through an adjustable opening 78 in form of a fine stream into the charged bag upon the weighing pan 35. The additional filling effects a slow sinking of the weighing pan 35, and at the moment the precise weight is obtained the already inclined mercury contact 39 switches off the magnet 28. The double coupling again engages the toothed coupling disk of the gear wheel 22 and the finished bag is removed while another bag is placed upon the supplementary weighing device.

When the iron core of the magnet is released the bell-crank 63 and the rail 65 are restored to their former position; the lever 69 is left behind and is pushed back by the roll 66 which runs down from the end of the rail 65 to its former position, thereby releasing the auxiliary weight lever 60 which now presses again the pan 35 with the next bag quickly up.

Through the running action of the roll 66 upon the rail 65 a space of time is gained that is required to turn the revolving supporter far enough to prevent the weight lever 60 from pushing up again the weighing pan 35 with the finished bag still thereon.

The auxiliary weight lever 60 is released by the running action of roll 66, when the revolving supporter is turned so far, that pan 35 is locked in its depressed position by a solid portion of the revolving disk 9. To insure that the bag to be weighed may be placed upon the weighing pan 35 without rubbing against the revolving disk 9 a placing device is arranged upon the table 13. This device consists of a lever 79 and the cam lever 80 both of them being adjustable relatively to each other and rotate together on a stud 81, a spring 82 keeping the device in working position. On the revolving disk 9 bosses 83 are provided. While the revolving supporter is moving the bosses swing the cam lever 80 of the placing device and the bag is thereby placed in advance of the movement of the revolving disk upon the weighing pan 35. The placing device thereafter jumps back owing to the action of the spring 82 against the stop 84, and the bag is left standing upon the weighing pan 35 with a clear space around it.

What I claim is:—

1. In a bagging and weighing machine, a charging funnel, a coacting rotatable carrier having an upper apertured plate, a lower apertured plate, container-holding means on the upper plate, an apertured support below the carrier, and a scale beam having a pan adapted to be projected through said support and toward the carrier.

2. In a bagging and weighing machine, a charging funnel, an inclosed stirring arm and an inclosed conveyer, a rotatable carrier beneath said funnel, said carrier having an upper apertured plate, a lower apertured plate and container-holding means on the upper plate, a scale beam having a pan below the lower plate, and adjustable means for actuating the stirring arm and conveyer.

3. In a bagging and weighing machine, a rotatable carrier, having an upper toothed and apertured disk, a lower apertured disk, an upright shaft connecting the disks, nozzles depending from the upper disk, and power-transmitting means intergeared with said upper disk.

4. In a bagging and weighing machine, a rotatable carrier, container-holding means on said carrier, a primary charging device coöperating with the carrier, a supplemental charging device likewise coöperating with the carrier, a scale beam beneath the carrier, a pan on said beam adapted to be projected toward the carrier, an electro-motor for operating the carrier and secondary charging device, and a mercury contact interposed between said electro-motor and the scale beam.

5. In a bagging and weighing machine, a rotatable carrier, container-holding means on said carrier, a primary charging device coöperating with the carrier, a supplemental charging device likewise coöperating with the carrier, a scale beam beneath the carrier, a pan on said beam adapted to be projected toward the carrier, an electro-motor, adapted to rotate the carrier, a mercury contact interposed between the scale beam and the electro-motor-magnet, and means controlled by said contact for arresting the carrier and for simultaneously actuating the supplemental charging device.

6. In a bagging and weighing machine, a rotatable carrier, container-holding means on said carrier, a primary charging device coöperating with the carrier, a supplemental charging device likewise coöperating with the carrier, a scale beam beneath the carrier, a pan on said beam adapted to be projected toward the carrier, a weighted lever adapted to engage the scale beam, a member adapted to lock said lever, a rail operatively connected to said member, and a rolling element movable along the rail and adapted to tilt the same and thereby release the weighted lever from the locking member.

JOSEPH HALSIG.

Witnesses:
J. WYNEN,
R. DEGEN.

Copies of this patent may be obtained for five cents each, by addressing the "Commissioner of Patents, Washington, D. C."